United States Patent [19]

Tsutsui et al.

[11] Patent Number: 4,653,538

[45] Date of Patent: Mar. 31, 1987

[54] HOT AND COLD WATER MIXING FAUCET

[75] Inventors: Osamu Tsutsui; Hidehiko Kuwahara; Hirohiko Yasuda, all of Fukuoka, Japan

[73] Assignee: Toto Ltd., Fukuoka, Japan

[21] Appl. No.: 822,744

[22] Filed: Jan. 27, 1986

[30] Foreign Application Priority Data

Jan. 29, 1985 [JP] Japan .................................. 60-15170

[51] Int. Cl.⁴ ........................................... F16K 11/074
[52] U.S. Cl. ................................ 137/625.46; 137/597
[58] Field of Search ...................... 137/625.46, 625.41, 137/597, 625.31

[56] References Cited

U.S. PATENT DOCUMENTS 2,990,853  7/1961  Sharp ......................... 137/625.46 X

FOREIGN PATENT DOCUMENTS 75323  3/1983  European Pat. Off. ......... 137/625.4

Primary Examiner—Robert G. Nilson
Attorney, Agent, or Firm—Bogucki, Scherlacher, Mok & Roth

[57] ABSTRACT

A faucet for mixing hot and cold water includes a valve casing, cold and hot water inlet pipes coupled to the valve casing, first and second outlet pipes coupled to the valve casing, a valve housed in the valve casing and having a fixed plate and a movable plate, and an actuator for angularly moving the movable plate. The fixed plate has at least one cold water passage hole communicating with the cold water inlet pipe, at least one hot water passage hole communicating with the hot water inlet pipe, a first outlet hole communicating with the first outlet pipe, and a second outlet hole communicating with the second outlet pipe. The movable plate is held rotatably slidably against the fixed plate in watertight relation and has a recess defined in the surface thereof slidably contacting the fixed plate. When the movable plate is angularly moved by the actuator, at least one of the cold and hot water passage holes is brought into selective communication with the first and second outlet holes through the recess.

4 Claims, 23 Drawing Figures

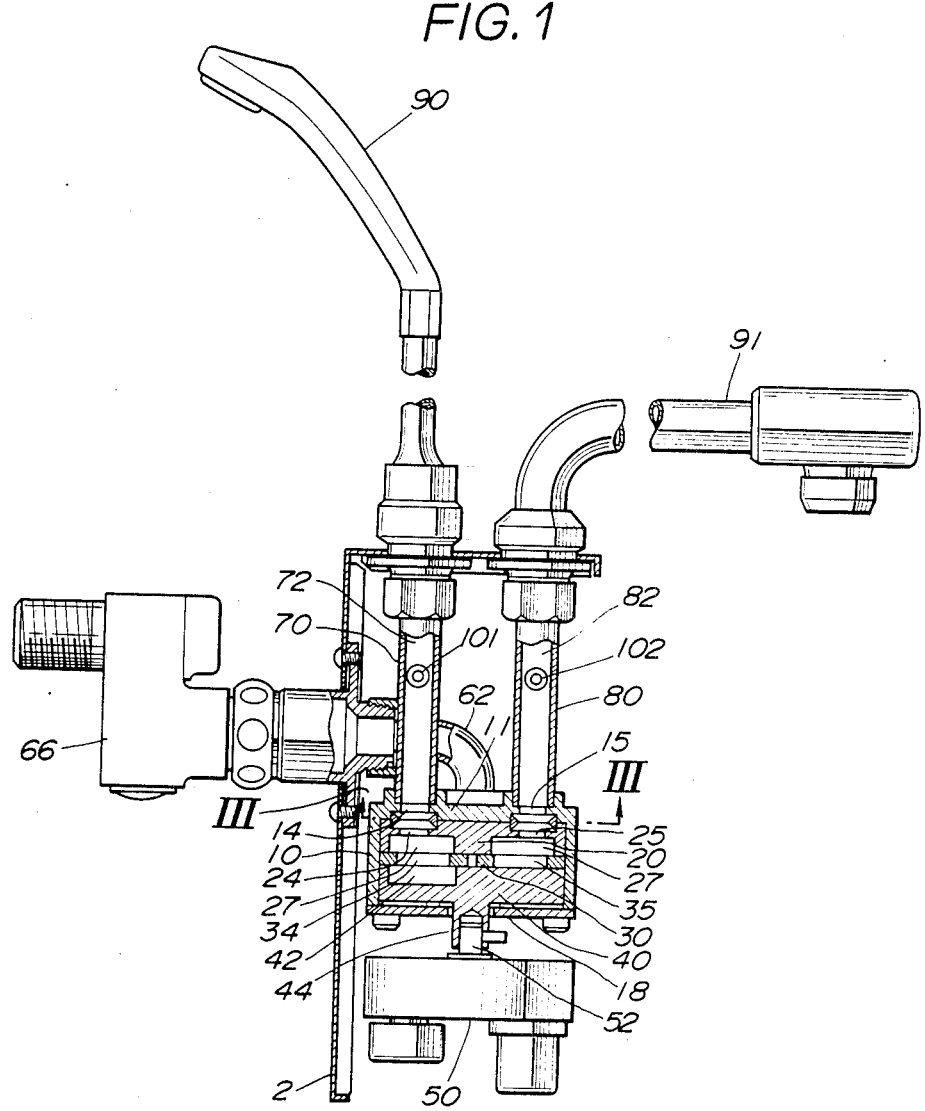

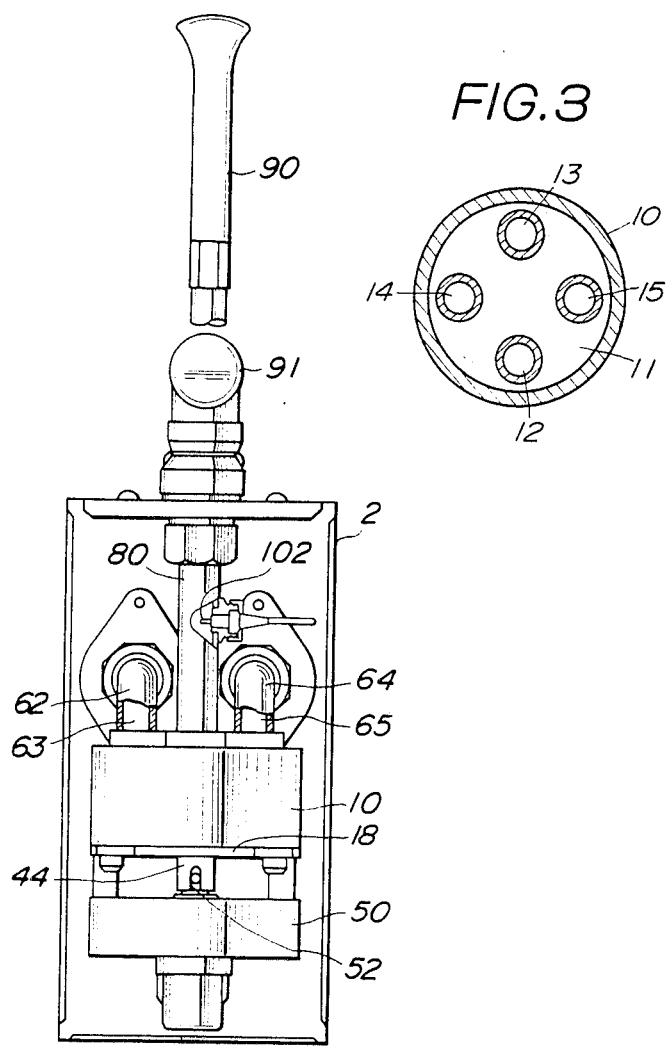

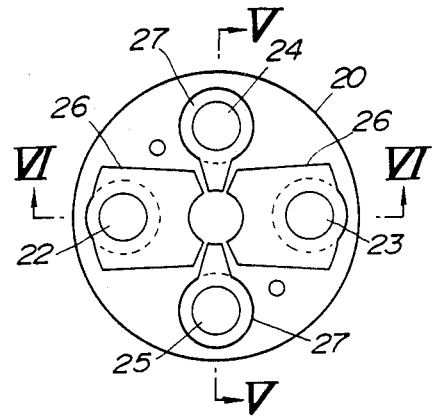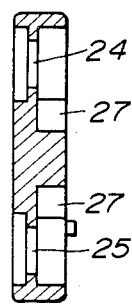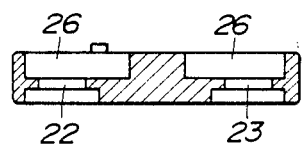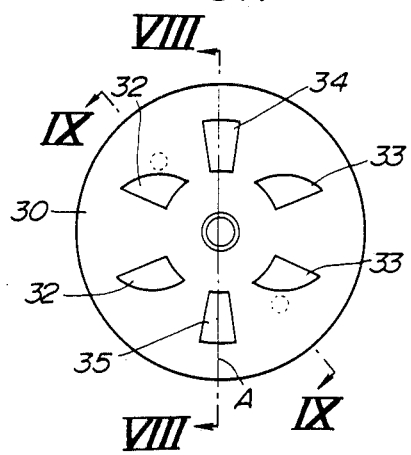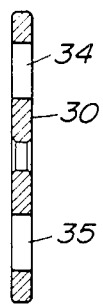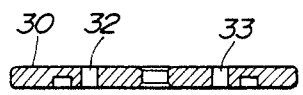

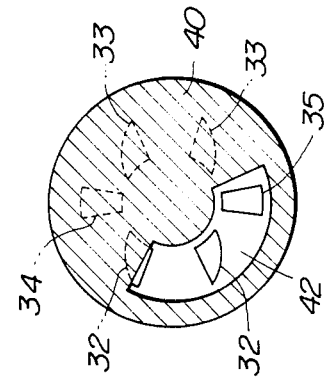
FIG.18  FIG.19
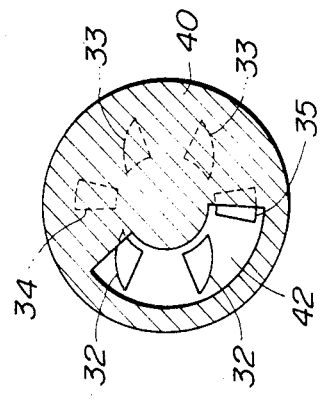
FIG.21
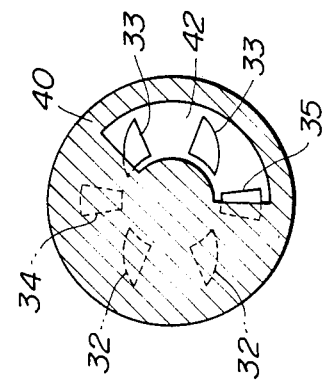
FIG.22
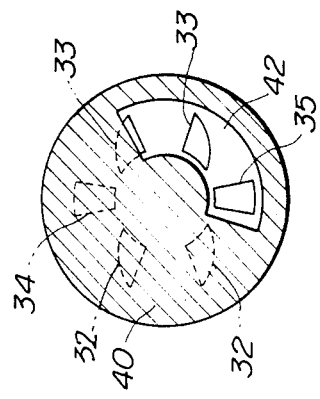
FIG.20
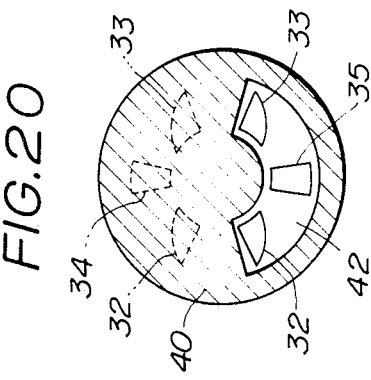

HOT AND COLD WATER MIXING FAUCET

BACKGROUND OF THE INVENTION

The present invention relates to a faucet for mixing hot and cold water, and more particularly to a hot and cold water mixing faucet for selectively supplying a mixture of hot and cold water to two different passages leading to a bathtub and a shower, respectively.

Various hot and cold water mixing faucets have heretofore been proposed. For example, Japanese Laid-Open Patent Publication No. 54(1979)-78527 discloses a hot and cold water mixing faucet which includes a mixing valve comprising a fixed plate having a cold water passage hole, a hot water passage hole, and an outlet hole, and a movable plate held slidably against the fixed plate in watertight relation and having a recess for allowing or preventing fluid communication between the cold water passage hole and/or the hot water passage hole and the outlet hole. The mixing faucet also includes two on-off valves coupled respectively to two outlet passages communicating with the outlet hole, each of the on-off valves having a valve seat and a valve body movable into and out of contact with the valve seat. Mixed hot and cold water can be supplied to a desired one of the outlet passages by opening a corresponding one of the on-off valves. However, such mixing faucet is necessarily large in overall size since it requires three valves, one for mixing hot and cold water, and two for selecting the outlet passages.

There has also been proposed a mixing faucet in which a single valve is used for selecting outlet passages, in lieu of the two on-off valves as stated above. Another proposed mixing faucet employs a thermostat mixing valve having a temperature sensor which can be expanded and contracted in response to the temperature of mixed water flowing in outlet passages. In this mixing faucet, the ratio of the opening of a cold water valve in a cold water inlet passage to the opening of a hot water valve in a hot water inlet passage is adjusted on the basis of a detected signal from the temperature sensor for automatically controlling the temperature of the mixed water until it reaches a desired temperature. However, these proposed mixing faucets cannot be reduced in size because they also require two valves, one for mixing hot and cold water and the other for switching the outlet passages.

SUMMARY OF THE INVENTION

It is therefore an object of the present invention to provide a novel hot and cold mixing faucet which employs a single valve for discharging and stopping mixed water, adjusting the temperature of the mixed water, and selecting one of two outlet passages at a time.

Another object of the present invention is to provide a hot and cold water mixing faucet which is small in size and can easily be manufactured and assembled.

According to a preferred embodiment of the present invention, a faucet for mixing hot and cold water includes a valve casing, a cold water inlet pipe coupled to the valve casing and having a cold water inlet passage, a hot water inlet pipe coupled to the valve casing and having a hot water inlet passage, a first outlet pipe coupled to the valve casing and having a first outlet passage, a second outlet pipe coupled to the valve casing and having a second outlet passage, a valve housed in the valve casing and having a fixed plate and a movable plate, and means for angularly moving the movable plate.

The fixed plate has at least one cold water passage hole communicating with the cold water inlet passage in the cold water inlet pipe, at least one hot water passage hole communicating with the hot water inlet passage in the hot water inlet pipe, a first outlet hole communicating with the first outlet passage, and a socond outlet hole communicating with the second outlet passage. The movable plate is held rotatably slidably against the fixed plate in watertight relation and has a recess defined in a surface thereof slidably contacting the fixed plate. When the movable plate is angularly moved by the actuator, at least one of the cold and hot water passage holes is brought into selective communication with the first and second outlet holes through the recess.

The recess of the movable plate is of a substantially sectorial shape having an angular extent large enough to cover the cold and hot water passage holes of the fixed plate and a selected one of the first and second outlet holes of the fixed plate.

The first and second outlet holes of the fixed plate are oppositely disposed on a line passing through the center of the fixed plate, the cold and hot water passage holes being disposed symmetrically with respect to the line.

The above and further objects, details and advantages of the present invention will become apparent from the following detailed description of a preferred embodiment thereof, when taken in conjunction with the accompanying drawings.

BRIEF DESCRIPTION OF THE DRAWINGS

FIG. 1 is a sectional side elevational view of a hot and cold water mixing faucet according to a preferred embodiment of the present invention;

FIG. 2 is front elevational view of the hot and cold water mixing faucet shown in FIG. 1;

FIG. 3 is a cross-sectional view taken along line III—III of FIG. 1;

FIG. 4 is a bottom view of a valve seat plate;

FIG. 5 is a cross-sectional view taken along line V—V of FIG. 4;

FIG. 6 is a cross-sectional view taken along line VI—VI of FIG. 4;

FIG. 7 is a bottom view of a fixed plate;

FIG. 8 is a cross-sectional view taken along line VIII—VIII of FIG. 7;

FIG. 9 is a cross-sectional view taken along line IX—IX of FIG. 7;

FIGS. 12 through 22 are cross-sectional views showing the manner in which the fixed and movable plates are operated.

DETAILED DESCRIPTION OF THE PREFERRED EMBODIMENT

Figure 10:
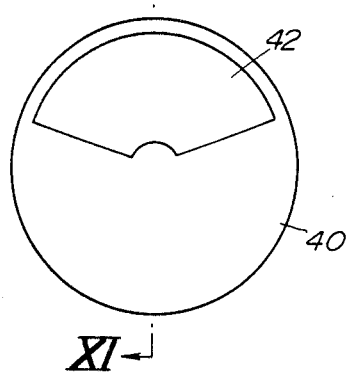
FIG. 10 is a bottom view of a movable plate.

FIG. 1 illustrates, by way of example, a hot and cold water mixing faucet according to a preferred embodiment of the present invention. The hot and cold water mixing faucet generally comprises a frame 2 and a cylindrical valve casing 10 housed in the frame 2. As shown in FIG. 3, the valve casing 10 includes an upper plate 11 having a cold water inlet hole 12, a hot water inlet hole 13, a first outlet opening 14, and a second outlet opening 15 which are arranged in angularly spaced relation. The hot water inlet hole 13 is angularly spaced 180° from the cold water inlet hole 12. The first and second outlet openings 14, 15 are angularly spaced 90° from the cold water inlet hole 12, and 180° from each other.

The cold and hot water inlet holes 12, 13 defined in the upper plate 11 are coupled respectively to one end of a cold water inlet pipe 62 and a hot water inlet pipe 64 (FIG. 2) as by fitting or threading. The cold and hot water inlet pipes 62, 64 have cold and hot water inlet passages 63, 65, respectively, defined therethrough. The other ends of the cold and hot water inlet pipes 62, 64 are coupled to a connector socket 66 (FIG. 1).

To the first and second outlet opening 14,15, there are coupled first ends of first and second outlet pipes 70, 80, respectively, as by fitting or threading. The first and second outlet pipes 70, 80 have first and second outlet passages 72, 82, respectively, defined therethrough. The other end of the first outlet pipe 70 is joined to a shower 90, and the other end of the second outlet pipe 80 is joined to a faucet spout 91.

The valve casing 10 accommodates therein a valve comprising a valve seat plate 20, a fixed plate 30, and a movable plate 40. These plates 20, 30, 40 are respectively in the form of discs each having substantially the same diameter as the inside diameter of the valve casing 10, and are preferably made of ceramics. The surfaces of the plates 20, 30, 40 are ground to a mirror finish such that they are held in watertight relation when put together.

The valve seat plate 20 is disposed in intimate contact with the lower surface of the upper plate 11 of the valve casing 10. As shown in FIGS. 4 through 6, the valve seat plate 20 has a cold water inlet 22, a hot water inlet 23, a first passage hole 24, and a second passage hole 25 which are defined transversely therethrough and correspond to the cold water inlet hole 12, the hot water inlet hole 13, the first outlet opening 14, and a second outlet opening 15, respectively. The surface of the valve seat plate 20 which is in contact with the fixed plate 30 has recesses 26, 26 defined therein in surrounding relation to the cold water inlet 22 and the hot water inlet 23, respectively, and recesses 27, 27 defined therein in surrounding relation to the first and second passage holes 24, 25, respectively.

The fixed plate 30 is held nonrotatably against the lower surface of the valve seat plate 20 in watertight relation. As shown in FIGS. 7 through 9, the fixed plate 30 has a pair of cold water passage holes 32, a pair of hot water passage holes 33, a first outlet hole 34, and a second outlet hole 35 which are defined transversely therethrough and correspond to the cold water inlet 22, the hot water inlet 23, the first passage hole 24, and the second passage hole 25, respectively. The pairs of cold water passage holes 32 and hot water passage holes 33 are symmetrically positioned with respect to a line A (FIG. 7) passing through the center of the fixed plate 30 and the centers of the first and second outlet holes 34, 35. The cold and hot water passage holes 32, 33 are held in fluid communication with the cold and hot water inlets 22, 23 in the valve seat plate 20 through the recesses 26, 26, respectively, defined therein. The first and second outlet holes 34, 35 are defined so as to be within the opening areas of the recesses 27, 27 defined in the valve seat plate 20.

Figure 11:
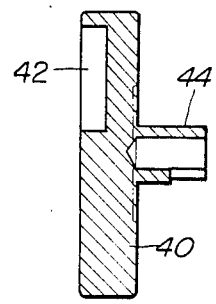
FIG. 11 is a cross-sectional view taken along line XI—XI of FIG. 10.
Figure 15:
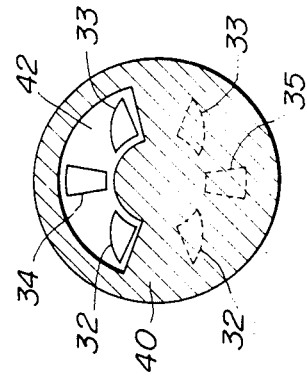

The movable plate 40 is held slidably against the lower surface of the fixed plate 30 in watertight relation, and is supported by a cover 18 attached to the open bottom of the valve casing 10. As shown in FIGS. 10 and 11, the movable plate 40 has a recess 42 defined in its surface slidable against the fixed plate 30 to communiate the cold water passage holes 32 and/or the hot water passage holes 33 with the first outlet hole 34 or the second outlet hole 35 in the fixed plate 30. As illustrated in FIG. 10, the recess 42 is of a substantially sectorial shape having an arcuate extent large enough to cover a maximum of three circumferentially adjacent holes (see FIG. 15) in the fixed plate 30. The movable plate 40 also has an integral sleeve 44 (FIG. 11) projecting downwardly from its lower surface. An actuator 50 (FIGS. 1 and 2) has an output shaft 52 inserted in and fixed to the sleeve 44.

The relationship between the holes 32, 33, 34, 35 of the fixed plate 30 and the recess 42 of the movable plate 40 upon rotation of the movable plate 40 will be described with reference to FIGS. 12 through 22.

Figure 12:
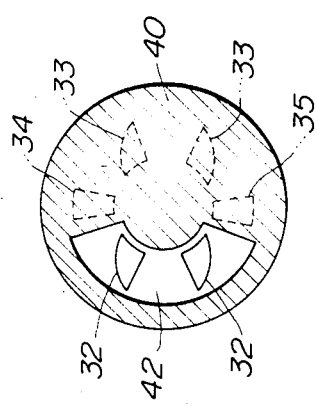

In the relative position shown in FIG. 12, the first and second outlet holes 34, 35 of the fixed plate 30 are closed by the movable plate 40 (at its shaded portion in FIG. 12), and hence neither hot water nor cold water is discharged from the shower 90. When the movable plate 40 is turned clockwise from the position of FIG. 12 to the position of FIG. 13, the two water passage holes 32, 32 are brought into communication with the first outlet hole 34 through the recess 42 of the movable plate 40, whereupon cold water is ejected from the shower 90. The amount of the discharged cold water is however small since the first outlet hole 34 is only partly open. As the movable plate 40 is further turned clockwise to the position of FIG. 14, the first outlet hole 34 is fully opened to deliver an increased amount of cold water to the shower 90. Angular movement of the movable plate 40 from the position of FIG. 14 to the position of FIG. 15 allows the first outlet hole 34 to communicate with one of the hot water passage holes 33, and the shower 90 now sprays a mixture of cold and hot water. When the movable plate 40 is turned to the successive positions of FIGS. 16 and 17, the first outlet hole 34 is brought out of communication with the cold water passage holes 32 and, then, into communication with the hot water passage holes 33 only, so that hot water is discharged from the shower 90. The supplied amount of hot water is maximum when the movable plate 40 is in the position of FIG. 16.

FIGS. 18 through 22 show the manner in which cold water, hot water, or a mixture thereof is supplied to the faucet spout 91. When the movable plate 40 is turned counterclockwise from the position of FIG. 12 to the position of FIG. 18, the second outlet hole 35 is brought into communication with the cold water passage holes 32 through the recess 42 of the movable plate 40, thereby discharging cold water from the faucet spout 91. Since the second outlet hole 35 is partly open at this time, the cold water is discharged in a small amount. As the movable plate 40 approaches the position of FIG. 20 through the position of FIG. 19, the second outlet hole 35 communicates with one of the hot water passage holes 33, and the temperature of discharged mixed water is gradually increased. Upon further counterclockwise rotation of the movable plate 40 via the position of FIG. 21 to the position of FIG. 22, the second outlet hole 35 is brought out of communication with the cold water passage hole 32 and, then, into communication with the hot water passage holes 33, whereupon only hot water is ejected from the faucet spout 91. The hot water is supplied in a maximum amount when the movable plate 40 is in the position of FIG. 21. The supplied amount of hot water is gradually reduced as the movable plate 40 is further turned from the position of FIG. 21 (see FIG. 22).

The fixed plate 30 may be integral with the valve seat plate 20. In this alternative, the recesses 26, 27 are defined in the lower surface of the upper plate 11 of the valve casing 10. It can readily be understood by those skilled in the art that the fixed plate 30 may have a single cold water passage hole 32 and a single hot water passage hole 33.

The actuator 50 shown in FIGS. 1 and 2 comprises a step motor (not shown) and a speed reducer (not shown) coupled to the step motor. The output shaft 52 of the actuator 50 is inserted in and fixed to the sleeve 44 of the movable plate 40, as described above, for angularly moving the movable plate 40 when the acutator 50 is energized.

Figure 23:
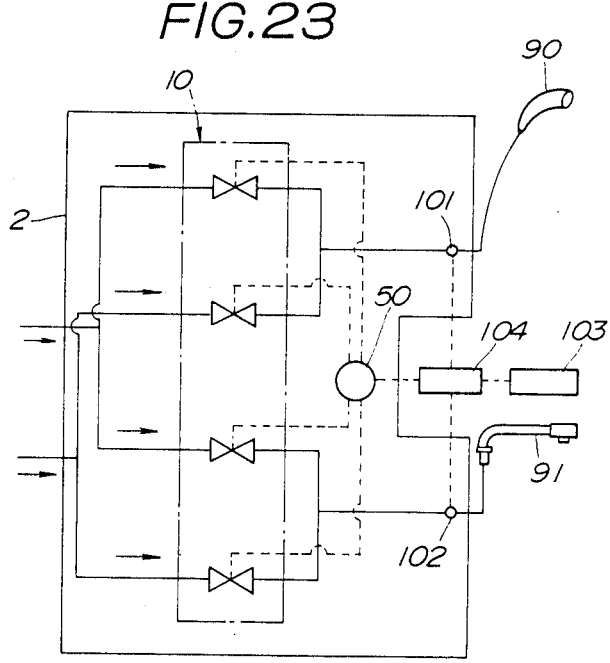
FIG. 23 is a diagram of a control system.
Figure 14:
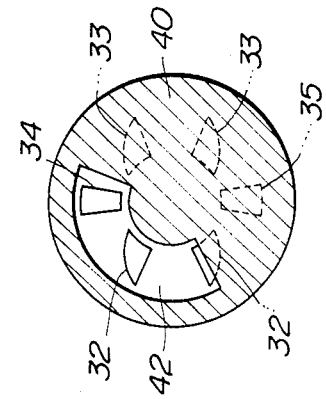
Figure 17:
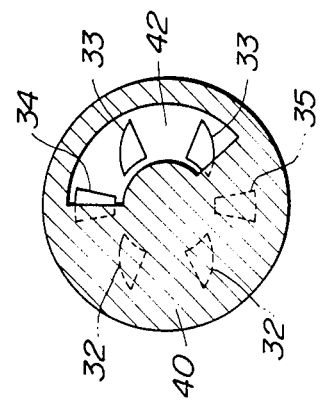
Figure 13:
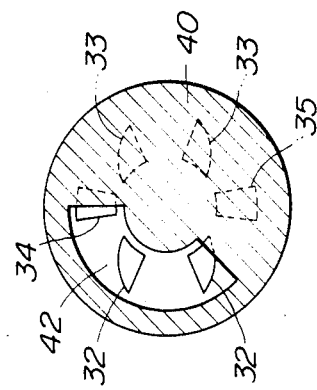
Figure 16:
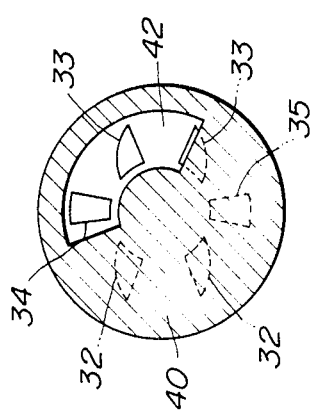

FIG. 23 schematically shows a control system for the hot and cold water mixing faucet of the present invention, the control system serving to control the actuator 50. The control system comprises a temperature sensor 101 employing a thermistor disposed in the first outlet passage 72 through the first outlet pipe 70, a temperature sensor 102 employing a thermistor disposed in the second outlet passage 82 through the second outlet pipe 80, a switch unit 103 having a changeover switch (not shown) for selecting one, at a time, of the first outlet passage 72 communicating with the shower 90 and the second outlet passage 82 communicating with the faucet spout 91, a stop switch (not shown) for stopping the supply of mixed water, and a temperature adjusting switch (not shown) for setting a temperature for discharged hot water, and a control unit 104 electrically connected to the actuator 50, the temperature sensors 101, 102, the switch unit 103, and a power supply (not shown), as illustrated.

In operation, the changeover switch in the switch unit 103 is operated to select a desired outlet passage, and the temperature adjusting switch is actuated to set a desired water temperature. Electric signals produced by these switches are applied to the control unit 104. The control unit 104 then issues an electric signal to the actuator 50 to drive same, thereby turning the movable plate 40. If the changeover switch is shifted to the shower position, then the movable plate 40 is turned clockwise (FIGS. 12 through 17). If the changeover switch is shifted to the faucet spout position, then the movable plate 40 is turned counterclockwise (FIGS. 18 through 22). When the selected outlet passage is supplied with mixed water upon rotation of the movable plate 40, the temperature sensor (which is the temperature sensor 101 if the shower is selected, and the temperature sensor 102 if the faucet spout is selected) detects the temperature of the mixed water supplied and generates a corresponding electric signal which is, in turn, delivered to the control unit 104. The control unit 104 compares the temperature detected by the temperature sensor with a temperature setting from the temperature setting switch, and energizes the actuator 50 to control the angular movement of the movable plate 40 so that the temperature of the mixed water will be equalized to the temperature setting at all times. More specifically, when the shower 90 is used, if the temperature detected by the temperature sensor 101 is lower than the temperature setting, then the movable plate 40 is turned clockwise. If the detected temperature is higher than the temperature setting, then the movable plate 40 is turned counterclockwise. When the faucet spout 91 is in use, if the temperature detected by the temperature sensor 102 is lower than the temperature setting, then the movable plate 40 is turned counterclockwise, and if the detected temperature is higher than the temperature setting, then the movable plate 40 is turned clockwise.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A faucet for mixing hot and cold water, comprising:
   a valve casing;
   a first inlet pipe coupled to said valve casing and having a first inlet passage;
   a second inlet pipe coupled to said valve casing and having a second inlet passage;
   a first outlet pipe coupled to said valve casing and having a first outlet passage;
   a second outlet pipe coupled to said valve casing and having a second outlet passage;
   a valve disposed in said valve casing and having a fixed plate and a movable plate;
   said fixed plate having at least one first passage hole communicating with said first inlet passage of said first inlet pipe, at least one second passage hole communicating with said second inlet passage of said second inlet pipe, a first outlet hole communicating with said first outlet passage, and a second outlet hole communicating with said second outlet passage; and
   said movable plate being held rotatably slidably against said fixed plate in watertight relation and having a recess defined in a surface thereof held in sliding contact with said fixed plate, said means for angularly moving being operable to angularly move said movable plate between a first position in which the recess provides no communication between the holes in the fixed plate and a second position in which the recess provides communication between at least one of said first and second passage holes and at least one of first and second outlet holes.

2. A faucet for mixing hot and cold water, comprising:
   a valve casing;
   a first inlet pipe coupled to said valve casing and having a first inlet passage;
   a second inlet pipe coupled to said valve casing and having a second inlet passage;
   a first outlet pipe coupled to said valve casing and having a first outlet passage;
   a second outlet pipe coupled to said valve casing and having a second outlet passage;
   a valve disposed in said valve casing and having a fixed plate and a movable plate;
   means for angularly moving said movable plate;
   said fixed plate having at least one first passage hole communicating with said first inlet passage of said first inlet pipe, at least one second passage hole communicating with said second inlet passage of said second inlet pipe, a first outlet hole communicating with said first outlet passage, and a second outlet hole communicating with said second outlet passage; and said movable plate being held rotatably slidably against said fixed plate in watertight relation and having a recess defined in a surface thereof held in sliding contact with said fixed plate, said recess being so sized as to selectively provide communication between at least one passage hole of said fixed plate and at most one of said first and second outlet holes of said fixed plate, said means for angularly moving being operable to angularly move said movable plate between a first position in which the recess provides no communication between the holes in the fixed plate and a second position in which the recess provides communication between at least one of said first and second passage holes and one of said first and second outlet holes.

3. A faucet according to claim 2, wherein said first and second outlet holes of said fixed plate are oppositely disposed on a line passing through the center of the fixed plate, and wherein said first and second passage holes are disposed symmetrically with respect to said line.

4. A faucet according to claim 2, wherein said watertight relation between the movable plate and the fixed plate is formed by direct contact between the fixed and movable plates.

* * * * *